US008669933B2

(12) United States Patent
Kunimori et al.

(10) Patent No.: US 8,669,933 B2
(45) Date of Patent: Mar. 11, 2014

(54) LIQUID CRYSTAL DISPLAY, ELECTRONIC DEVICE, AND METHOD FOR CONTROLLING BRIGHTNESS OF ILLUMINATION UNIT OF LIQUID CRYSTAL DISPLAY

(75) Inventors: Takashi Kunimori, Tottori (JP);
Yasushi Yamazaki, Azumino (JP);
Masanori Yasumori, Tottori (JP)

(73) Assignee: Japan Display West Inc., Aichi-Ken (JP)

( * ) Notice: Subject to any disclaimer, the term of this patent is extended or adjusted under 35 U.S.C. 154(b) by 1409 days.

(21) Appl. No.: 12/127,863

(22) Filed: May 28, 2008

(65) Prior Publication Data

US 2008/0297466 A1    Dec. 4, 2008

(30) Foreign Application Priority Data

Jun. 1, 2007  (JP) ................. 2007-146546

(51) Int. Cl.
*G09G 3/36* (2006.01)

(52) U.S. Cl.
USPC ............................................. 345/102

(58) Field of Classification Search
USPC .............. 345/76–104, 204–215, 690–699
See application file for complete search history.

(56) References Cited

U.S. PATENT DOCUMENTS

| | | | | |
|---|---|---|---|---|
| 5,239,295 A * | 8/1993 | DeLuca et al. | | 340/7.4 |
| 7,388,569 B2 | 6/2008 | Agari et al. | | |
| 7,759,627 B2 * | 7/2010 | Kunimori et al. | | 250/214 AL |
| 2005/0067553 A1 * | 3/2005 | Agari et al. | | 250/205 |
| 2006/0279690 A1 * | 12/2006 | Yu et al. | | 349/199 |
| 2007/0030222 A1 * | 2/2007 | Lee et al. | | 345/87 |
| 2007/0046619 A1 * | 3/2007 | Sano et al. | | 345/102 |
| 2007/0171182 A1 * | 7/2007 | Mizuno et al. | | 345/102 |
| 2007/0188441 A1 * | 8/2007 | Tanaka et al. | | 345/102 |
| 2007/0229452 A1 * | 10/2007 | Sano et al. | | 345/102 |
| 2008/0079860 A1 * | 4/2008 | Kunimori et al. | | 349/43 |

FOREIGN PATENT DOCUMENTS

| | | | |
|---|---|---|---|
| JP | 60071920 A | * | 4/1985 |
| JP | 9146073 A | * | 6/1997 |
| JP | 2002-131719 | | 5/2002 |
| JP | 2003-215534 | | 7/2003 |
| JP | 2004-007237 | | 1/2004 |
| JP | 2005-121997 | | 5/2005 |
| JP | 2007-094097 | | 4/2007 |
| JP | 2007-279100 | | 10/2007 |
| WO | WO03/050602 | | 6/2003 |

* cited by examiner

*Primary Examiner* — Alexander Eisen
*Assistant Examiner* — Patrick F Marinelli
(74) *Attorney, Agent, or Firm* — K&L Gates LLP

(57) ABSTRACT

A liquid crystal display according to an embodiment of the present invention includes a liquid crystal display panel, an illumination unit for the liquid crystal display panel, a plurality of photodetectors, and a control unit Cnt to control the brightness of the illumination unit. The photodetectors are TFT ambient light photosensors $LS_1$ to $LS_3$, for example, which produce outputs that require time to reach a predetermined value, which the time is correlated with the intensity of ambient light. Detection circuits coupled to the photodetectors include circuits ($Cmp_1$ to $Cmp_3$) logically inverted when an output from the TFT ambient light photosensors $LS_1$ to $LS_3$ reaches a predetermined value. The control unit Cnt includes a discrimination implement Maj that determines that the intensity of ambient light has changed when outputs from the majority of the detection circuits are logically inverted. The above-mentioned structure provides a liquid crystal display that does not use plurality of interface circuits nor A/D converters, nor experience frequent malfunctions for automatic control of the brightness of the illumination unit according to the intensity of ambient light.

3 Claims, 12 Drawing Sheets

LIQUID CRYSTAL DISPLAY, ELECTRONIC DEVICE, AND METHOD FOR CONTROLLING BRIGHTNESS OF ILLUMINATION UNIT OF LIQUID CRYSTAL DISPLAY

BACKGROUND

1. Technical Field

The present invention relates to a liquid crystal display (LCD) including a backlight, frontlight, or any other illumination units, and a method for controlling the brightness of the illumination unit included in such an LCD. More particularly, the present invention relates to an LCD and an electronic device that do not use a plurality of interface circuits nor A/D converters, nor experience frequent malfunctions to employ a plurality of photodetectors which produce outputs that require time to reach a predetermined value, which the time is correlated with the intensity of ambient light for automatic control of the brightness of the illumination unit according to the intensity of the ambient light, and to a method for controlling the brightness of the illumination unit included in such an LCD.

2. Related Art

Over recent years the application of LCDs has spread rapidly, not only in information and telecommunications equipment but in electrical equipment in general. Since LCD panels do not themselves emit light, transmissive LCDs equipped with a backlight as illumination unit are much employed. Especially for portable equipment, reflective LCDs which need no backlight have been used, in order to reduce power consumption. But reflective LCDs use ambient light for an illuminating unit and therefore are difficult to view in dark interiors of rooms, etc. Accordingly, in recent times particular progress has been made with the development of reflective LCDs equipped with a frontlight for an illumination unit and semi-transmissive LCDs which possess the capabilities of both the transmissive and reflective LCDs.

Reflective LCDs having a frontlight as an illumination unit display images by lighting the frontlight in dark places, and by utilizing ambient light with the frontlight turned off in bright places. Semi-transmissive LCDs display images by lighting a backlight for an illumination unit and utilizing the transmissive part of the pixel region in dark places, and by utilizing ambient light via the reflective part, without lighting the backlight, etc., in bright places. Thus, such reflective or semi-transmissive LCDs have the advantages of not needing to light the frontlight, backlight, or other illumination units constantly, and of being able to drastically reduce power consumption.

Transmissive LCDs require lower brightness levels of the backlight in dark places, but higher brightness levels thereof in bright places to provide clear visibility.

As mentioned above, the intensity of ambient light affects visibility on the screen of all types of LCDs, and therefore, generally known are such inventions as disclosed in JP-A-2002-131719, JP-A-2003-215534, and JP-A-2004-007237 of LCDs equipped with a photodetector whose output indicates the brightness of ambient light. In such an LCD, the brightness of the illumination unit is controlled according to a detection result given by the photodetector.

For example, JP-A-2002-131719 discloses an LCD that has thin-film transistors (TFTs) which serve as a photodetector on a substrate of the LCD panel. By detecting photo-leakage currents generated in the TFTs, the LCD calculates ambient brightness and automatically controls switching of the backlight according to the brightness. JP-A-2003-215534 discloses an LCD that uses a photodiode for a photodetector and provides temperate-compensated currents to light-emitting diodes (LEDs) which serve as a backlight according to ambient brightness. JP-A-2004-007237 discloses the invention of a mobile terminal that uses LEDs for both a backlight or an operation-state display and a photodetector. In the mobile terminal, switching of the backlight is controlled based on the electromotive force of the LEDs which are generated according to ambient brightness.

When the brightness of an illumination unit is controlled according to the intensity of ambient light as mentioned above, however, ambient light temporarily shaded by a hand or any other object possibly causes false detection of weaker ambient light, resulting in a malfunction. JP-A-2005-121997, therefore, discloses the invention of a method for controlling the backlight of an LCD including a plurality of photodetectors, wherein control of the backlight or any other illumination unit is not enabled until the output from all photodetectors changes to the same extent. JP-A-2007-094097 also discloses the invention of an LCD including a plurality of photodetectors, wherein control of the backlight or any other illumination unit is not enabled until the majority of photodetector outputs change.

In the inventions disclosed by JP-A-2005-121997 and JP-A-2007-094097, analog output devices such as photodiodes and phototransistors are used for a plurality of photodetectors. Outputs therefrom are arithmetically processed, and then control of the backlight or any other illumination unit is enabled based on the arithmetic results. A direct correlation between a current or voltage value output from such an analog output photodetector and the intensity of ambient light makes it easy to determine whether the intensity of ambient light exceeds a predetermined value.

Referring again to JP-A-2002-131719, TFTs used for an ambient light photosensor to detect photo-leakage currents therein (hereinafter called "TFT ambient light photosensor") show a correlation between the time period taken for a voltage output from the TFT ambient light photosensor to reach a predetermined voltage level and the intensity of ambient light. Use of such a TFT ambient light photosensor essentially requires digital arithmetic processes to determine the intensity of ambient light. The operation principle of such a TFT ambient light photosensor and common detection circuit will be described with reference to the accompanying drawings.

FIG. 10 shows an example of voltage current curves of a TFT ambient light photosensor. FIG. 11 shows an operating circuit diagram of a TFT ambient light photosensor. FIG. 12 shows curves for a voltage at both ends of the capacitor versus time in the circuit diagram shown in FIG. 11 at different brightness levels.

TFT ambient light photosensors and TFTs used for switching elements in an active-matrix liquid crystal display panel essentially have the same structure, which brings the advantage of forming a TFT ambient light photosensor and TFTs used in the active-matrix liquid crystal display panel at the same time. Referring to FIG. 10, such a TFT ambient light photosensor, shaded from light, carries very low dark currents in a gate-off state, and the brighter light shines on the channel, the higher leakage currents it carries.

Referring to FIG. 11, to take advantage of the characteristic of a TFT ambient light photosensor, a constant reverse-bias voltage (e.g., −10V) is applied to a TFT gate electrode GL in the light receptor of the TFT ambient light photosensor LS to create a gate-off state with a capacitor C connected in parallel between a drain electrode $D_L$ and a source electrode $S_L$, and a terminal on both of the drain electrode $D_L$ and the capacitor C is connected to ground potential. Under this condition, a constant reference voltage $V_S$ (e.g., +2V) is applied to both ends of the capacitor C with a switching element S1 turned on. When the switching element S1 is turned off, the voltage at both ends of the capacitor C decreases according to ambient brightness around the TFT ambient light photosensor with the passage of time, as shown in FIG. 12.

As a result, in the TFT ambient light photosensor, the time period taken to decrease to a predetermined voltage $V_0$ after the switching element S1 has been turned off is inversely proportional to the intensity of ambient light. A voltage at both ends of the capacitor C is also inversely proportional to the intensity of ambient light after a predetermined time point $t_0$. Ambient light brightness, therefore, can be calculated by measuring the time period taken to decrease to a predetermined voltage $V_0$ after the switching element S1 has been turned off, or by measuring a voltage at both ends of the capacitor C after a predetermined time point to.

Generally, in order to determine whether the intensity of ambient light exceeds a predetermined value, a sampling hold circuit synchronizing with the on-off state of the switching element S1 is used for data conversion into an analog output voltage, which then undergoes digital arithmetic processes after digital conversion by an A/D converter.

When a plurality of TFT ambient light photosensors are used to control switching of the backlight or any other illumination unit based on the intensity of ambient light and to prevent malfunctions caused by temporarily-shaded ambient light as mentioned above, however, each TFT ambient light photosensor needs a corresponding interface circuit, A/D converter, or the like.

SUMMARY

An advantage of some aspects of the invention is to provide an LCD and an electronic device including a backlight, frontlight, or any other illumination unit which does not use a plurality of interface circuits nor A/D converters to employ a plurality of TFT ambient light photosensors for photodetectors and prevents malfunctions caused by temporarily-shaded ambient light, and a method for controlling the brightness of an illumination unit included in such an LCD.

A liquid crystal display according to an aspect of the invention includes a liquid crystal display panel including a pair of substrates sandwiching a liquid crystal layer therebetween, an illumination unit for the liquid crystal display panel, a plurality of photodetectors that detect intensity of ambient light, a plurality of detection circuits coupled to the photodetectors, and a control unit for controlling brightness of the illumination unit for the liquid crystal display panel based on outputs from the detection circuits. The photodetectors produce outputs that require time to reach a predetermined value, which the time is correlated with the intensity of the ambient light. The detection circuits including a circuits logically inverted when an output from the photodetectors reaches a predetermined value. The control unit includes a discrimination implement that determines the intensity of the ambient light has changed when half or more of the outputs from the detection circuits is inverted.

The liquid crystal display needs to have photodetectors producing outputs that require time to reach a predetermined value, which the time is correlated with the intensity of the ambient light, and detection circuits including the circuits logically inverted when an output from the photodetectors reaches a predetermined value. The combination of the photodetectors and the detection circuits makes it possible to logically invert the outputs from the detection circuits in the order of the outputs from the photodetectors reaching a predetermined value, without using a plurality of interface circuits, A/D converters, or other complicated circuits used in related-art examples, whereby the discrimination implement readily detects that half or more of the outputs from the detection circuits has been logically inverted.

Even when the intensity of ambient light the photodetectors detect increases or decreases temporality with a part of the photodetectors temporarily covered by a hand or any other object or accidentally illuminated with light, the liquid crystal display does not determines that the intensity of ambient light has changed unless the intensity of ambient light detected by half or more of the photodetectors reaches a predetermined value. Accordingly, the liquid crystal display makes it possible to avoid a false change in the brightness of the illumination unit with a simple structure even if a part of the photodetectors detects irregular intensity of ambient light.

Even when a part of the photodetectors breaks and becomes unable to detect the intensity of ambient light, the liquid crystal display can detect the intensity of ambient light with other photodetectors and change the brightness of the illumination unit.

In the liquid crystal display, with the detection circuits arranged in an even number, and the discrimination implement may determine the intensity of the ambient light has changed when outputs from a majority of the detection circuits are logically inverted.

This arrangement particularly with an even number of detection circuits makes it possible to further prevent malfunction by determining the intensity of the ambient light has changed when outputs from a majority of the detection circuits (e.g., three or four detection circuits out of four) are logically inverted.

In the liquid crystal display, each of the detection circuits may be a comparator.

This arrangement makes it possible to ensure logical inversion with an economical and simple circuit configuration when the voltage of the capacitor included in the detection circuits reaches a predetermined value.

In the liquid crystal display, the photodetectors and the detection circuits may be both provided on the substrate included in the liquid crystal display panel.

This arrangement makes it possible to provide a compact liquid crystal display with the photodetectors and the detection circuits arranged in the liquid crystal display panel.

In the liquid crystal display, each of the photodetectors may include a light-receiving element made of, a thin-film transistor (TFT), and a capacitor coupled between a source electrode and a drain electrode of the TFT, one terminal of the capacitor being coupled to a reference voltage supply via a switching element and another terminal of the capacitor being coupled to a predetermined potential, a gate electrode of the TFT being applied with a constant voltage which is a reverse-bias voltage lower than the predetermined potential. Each of the detection circuits includes a circuit which may be coupled to one terminal of the capacitor included in each of the photodetectors, activate the switching element for a short period of time to apply the capacitor with a reference voltage supplied from the reference voltage supply and charge the capacitor, turn off the switching element, and is logically inverted when the voltage of the capacitor reaches a predetermined value.

This arrangement makes it possible to manufacture the TFT light-receiving element, the capacitor, and the switching element at the same time in the manufacturing process of the liquid crystal display, thereby requiring no additional manufacturing step to manufacture the photodetectors in particular.

In the liquid crystal display, the illumination unit may be a backlight, and the liquid crystal display panel may be a transmissive or semi-transmissive liquid crystal display panel.

This arrangement with a transmissive liquid crystal display panel makes it possible to clearly view images with a lower brightness level of the backlight for an illumination unit in dark places, and to clearly view images with a higher brightness level of the backlight in bright places. Accordingly, there is no need to keep the brightness level of the backlight high. Furthermore, this arrangement with a semi-transmissive liquid crystal display panel makes it possible to display images by lighting the backlight for an illumination unit and utilizing the transmissive part of the pixel region in dark places, and by utilizing ambient light via the reflective part, without lighting the backlight, etc., in bright places. Thus, this arrangement has the advantages of not needing to light the backlight or other illumination units constantly to keep a bright condition, and of being able to drastically reduce power consumption.

In the liquid crystal display, the illumination unit may be a frontlight, and the liquid crystal display panel may be a reflective liquid crystal display panel.

This arrangement makes it possible to display images by lighting the frontlight in dark places, and by utilizing ambient light with the frontlight turned off in bright places. Accordingly, there is no need to constantly turn on the photodetectors of the frontlight, etc., thereby drastically reducing power consumption.

An electronic device according to another aspect of the invention includes any of the above-described liquid crystal displays.

It is therefore possible to provide an electronic device particularly having advantageous effects of the above-described liquid crystal displays.

A method for controlling brightness of an illumination unit in a liquid crystal display according to still another aspect of the invention is a method for controlling brightness of an illumination unit in a liquid crystal display including a liquid crystal display panel having a pair of substrates sandwiching a liquid crystal layer therebetween, the illumination unit for the liquid crystal display panel, and a plurality of photodetectors that detect intensity of ambient light. The method includes: with the photodetectors producing outputs that require time to reach a predetermined value, which the time is correlated with the intensity of the ambient light, determining the intensity of the ambient light has changed when half or more of the outputs from the photodetectors reaches a predetermined value, so as to control the brightness of the illumination unit in the liquid crystal display.

The method makes it possible to logically invert the outputs from the detection circuits in the order of the outputs from the photodetectors reaching a predetermined value, without using a plurality of interface circuits, A/D converters, or other complicated circuits, whereby a discrimination implement readily detects that half or more of the outputs from the detection circuits has been logically inverted.

Even when the intensity of ambient light the photodetectors detect increases or decreases temporality with a part of the photodetectors temporarily covered by a hand or any other object or accidentally illuminated with light, it is not determined that the intensity of ambient light has changed unless the intensity of ambient light detected by half or more of the photodetectors reaches a predetermined value. Accordingly, the method makes it possible to avoid a false change in the brightness of the illumination unit in a simple manner even if a part of the photodetectors detects irregular intensity of ambient light.

Even when a part of the photodetectors breaks and becomes unable to detect the intensity of ambient light, the method makes it possible to detect the intensity of ambient light with other photodetectors and change the brightness of the illumination unit.

BRIEF DESCRIPTION OF DRAWINGS

The invention will be described with reference to the accompanying drawings, wherein like numbers reference like elements.

DESCRIPTION OF EXEMPLARY EMBODIMENTS

Preferred embodiments of the invention will be described hereinafter with reference to the following examples and accompanying drawings with a semi-transmissive LCD taken for example. The embodiments described and illustrated hereinafter, however, should not be considered as limiting the invention thereto. The invention may be equally applied to various changes and modifications made without departing from the spirit and scope of the appended claims.

Figure 1:
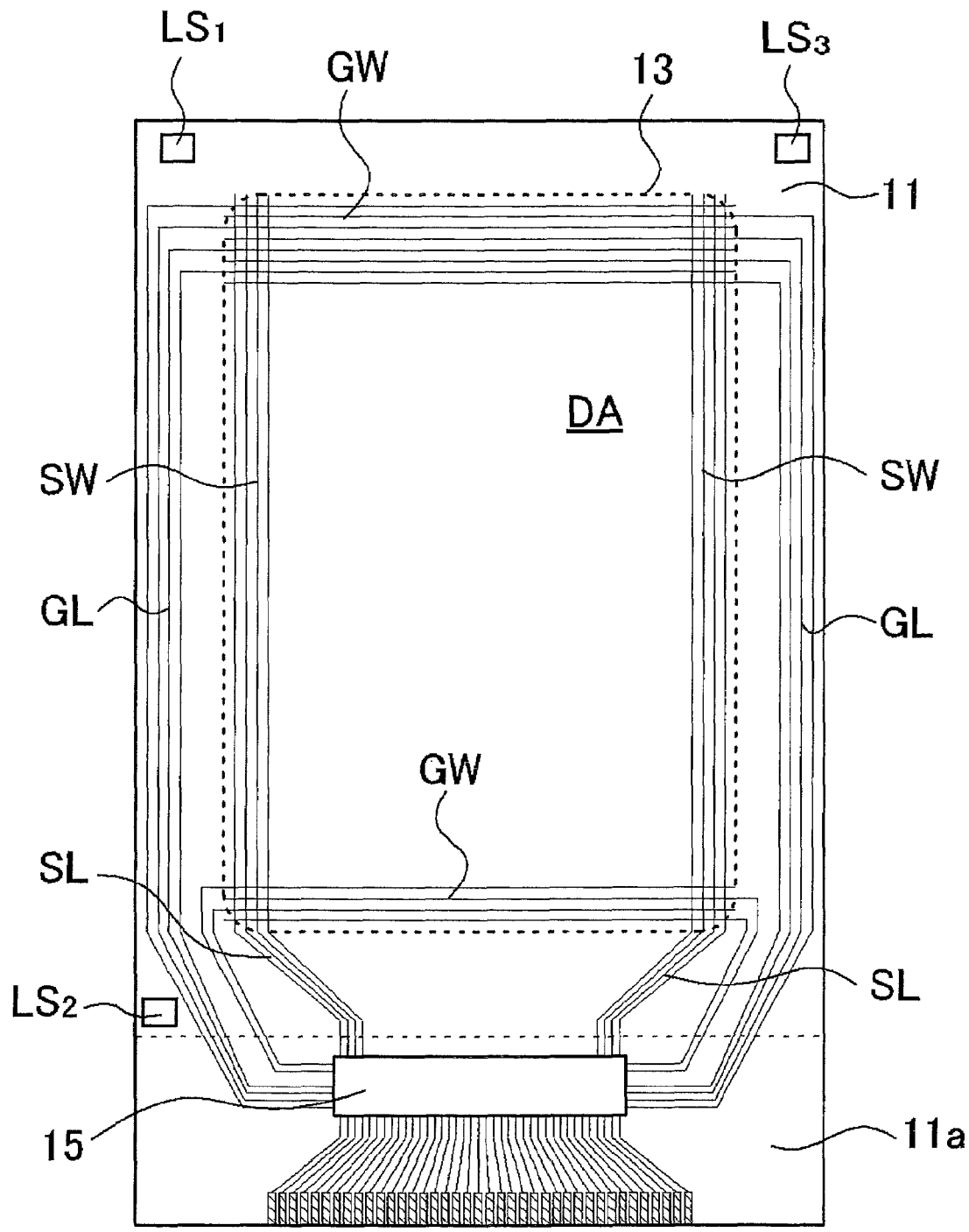
FIG. 1 is a plain view of the array substrate of a semi-transmissive LCD in one embodiment of the invention, seen through a color filter substrate thereof.
Figure 2:
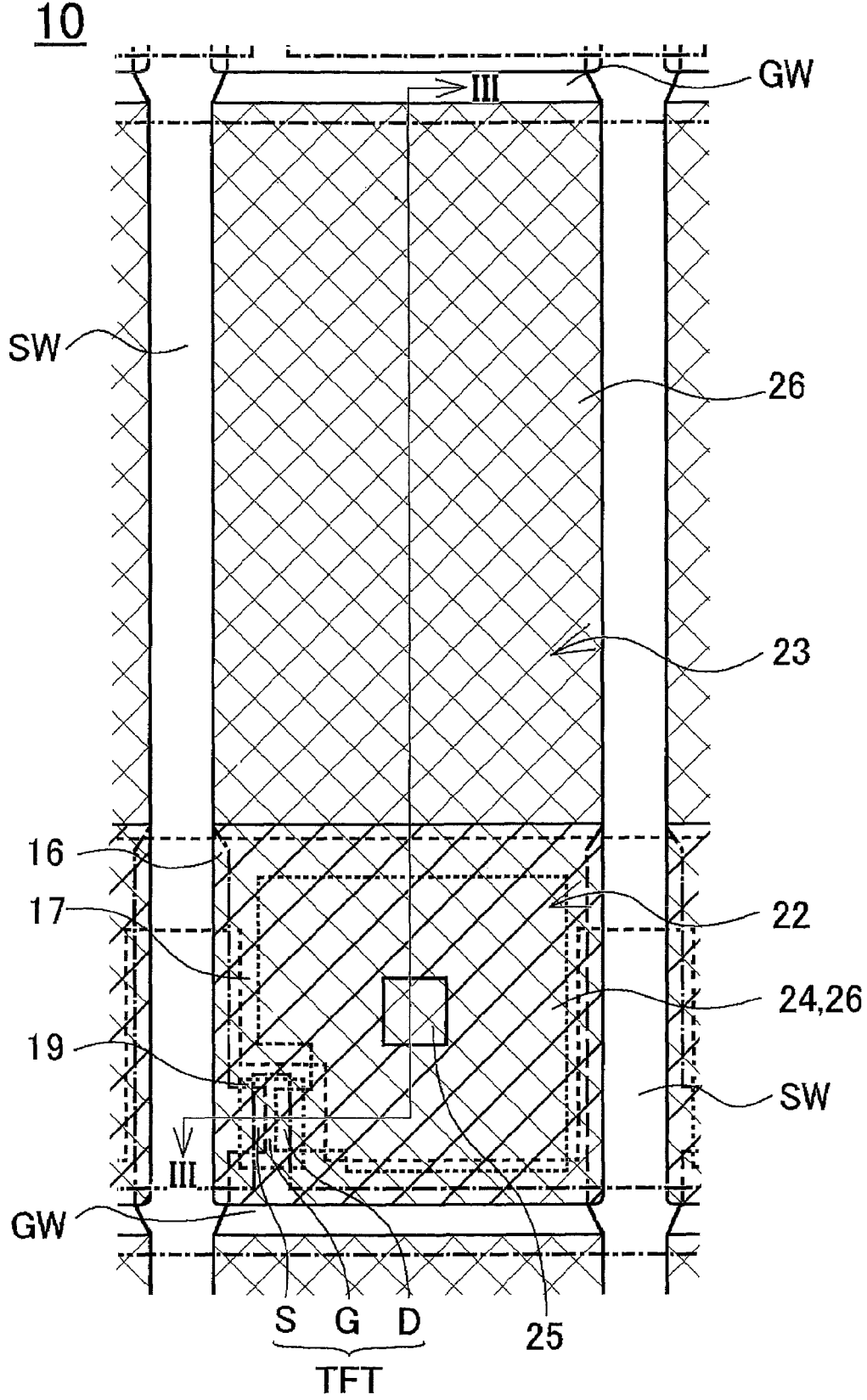
FIG. 2 is a plain view of a single pixel on the array substrate of FIG. 1.
Figure 3:
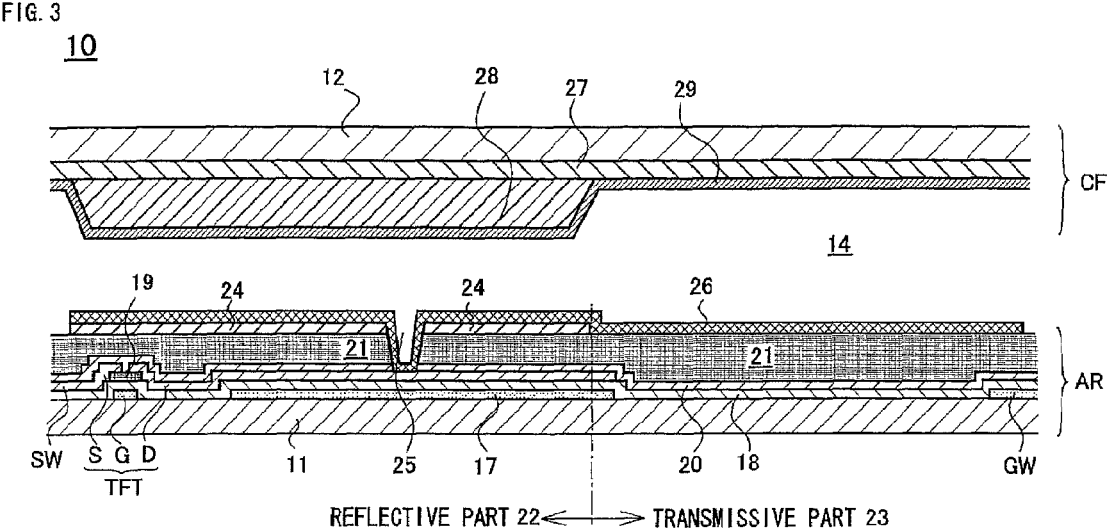
FIG. 3 is a sectional view taken along the line III-III of FIG. 2.
Figure 4:
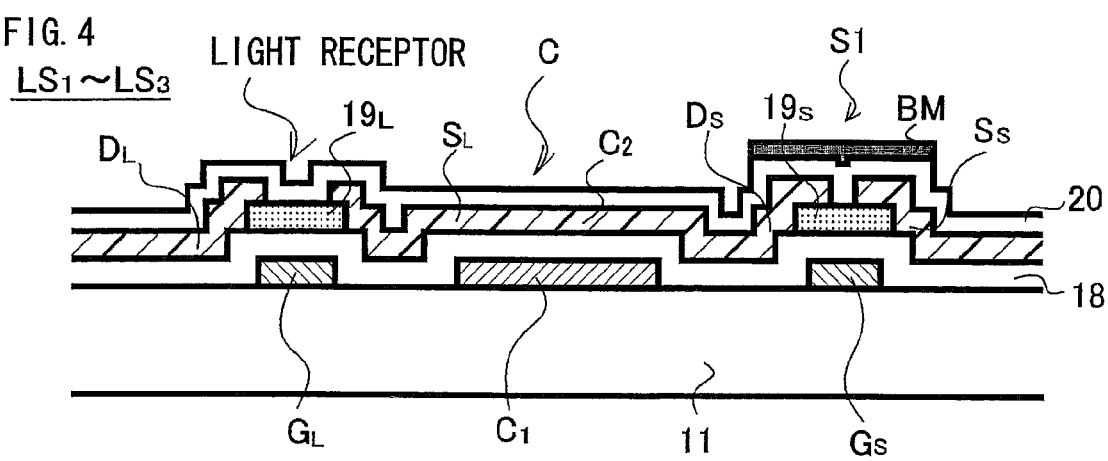
FIG. 4 is a sectional view of a TFT ambient light photosensor.
Figure 5:
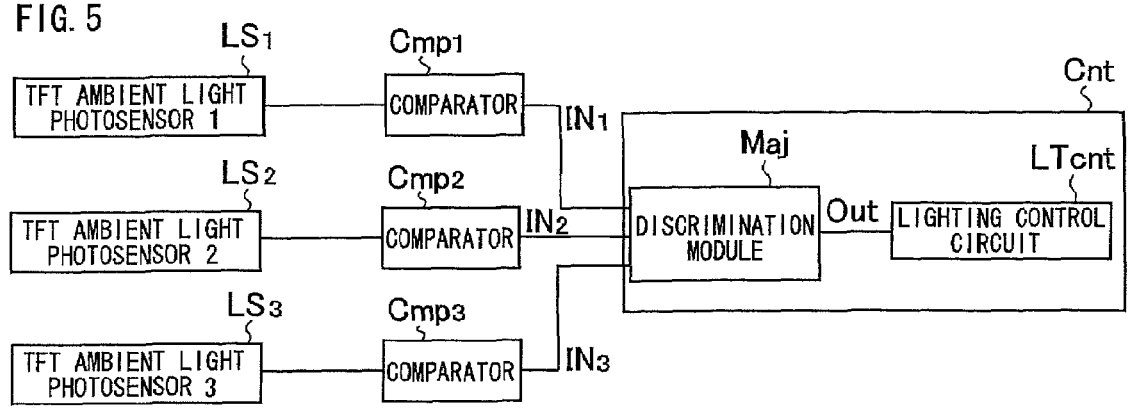
FIG. 5 is a block diagram of a circuit to process signals from TFT ambient light photosensors.
Figure 6:
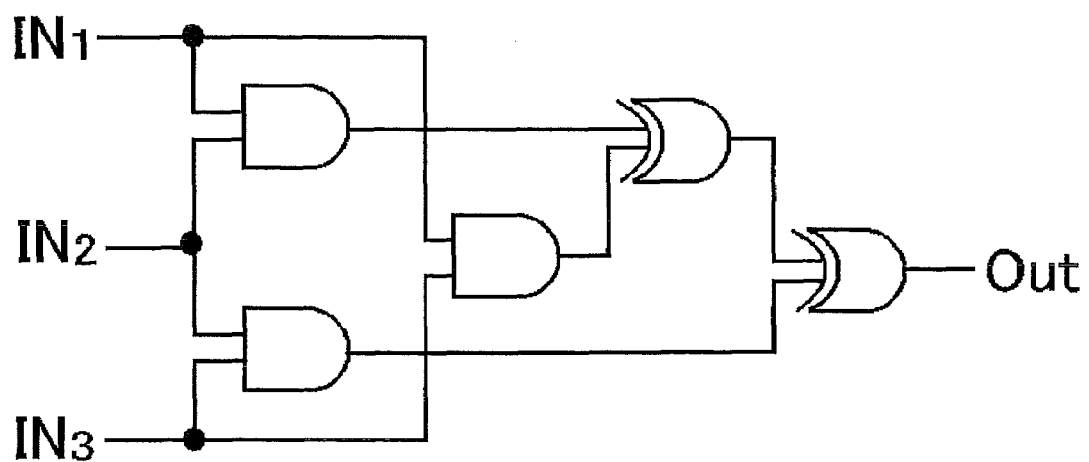
FIG. 6 is a circuit diagram showing an example of the majority circuit of FIG. 5.
Figure 7:
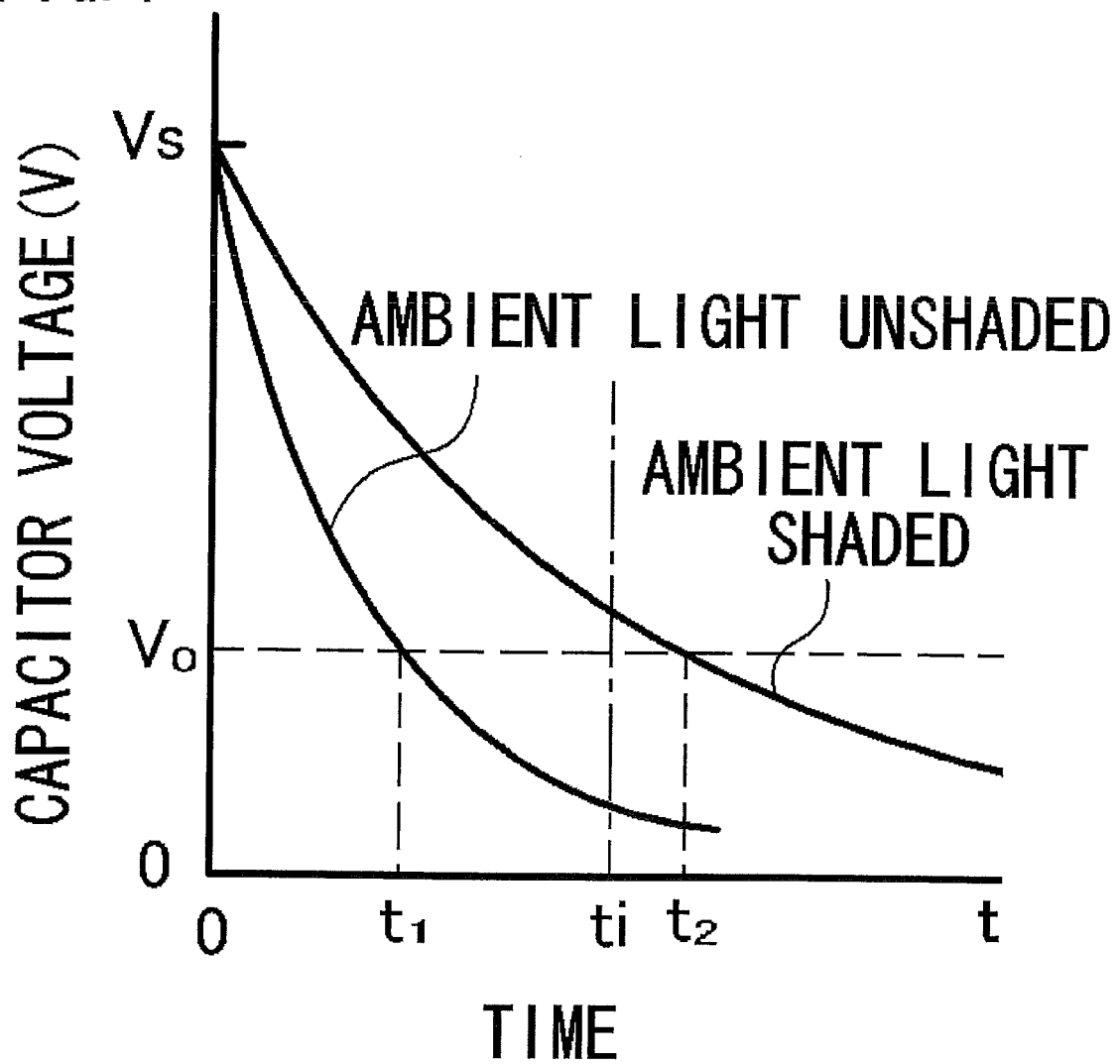
FIG. 7 is a diagram showing a difference between the outputs from a TFT ambient light photosensor with ambient light shaded and unshaded.
Figure 8:
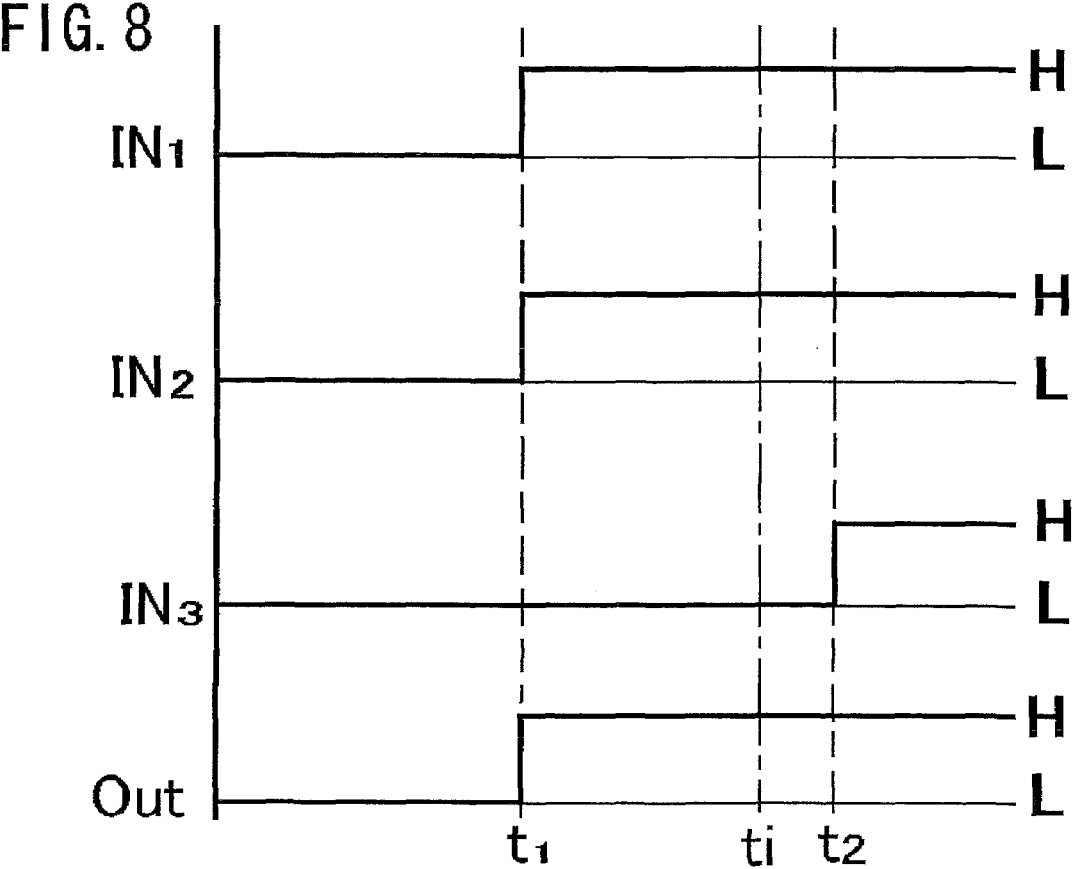
FIG. 8 is a diagram showing the timing of each output shown in the block diagram of FIG. 7.

FIG. 1 is a plain view of the array substrate of the semi-transmissive LCD panel in one embodiment of the invention, seen through a color filter substrate thereof. FIG. 2 is a plain view of a single pixel on the array substrate of FIG. 1. FIG. 3 is a sectional view taken along the line III-III of FIG. 2. FIG. 4 is a sectional view of a TFT ambient light photosensor. FIG. 5 is a block diagram of a circuit to process signals from TFT ambient light photosensors. FIG. 6 is a circuit diagram showing an example of the majority circuit of FIG. 5. FIG. 7 is a diagram showing a difference between the outputs from a TFT ambient light photosensor with ambient light shaded and unshaded FIG. 8 is a diagram showing the timing of each output shown in the block diagram of FIG. 7.

First, the structure of a semi-transmissive LCD 10 will be outlined. Referring to FIGS. 1 to 3, the semi-transmissive LCD 10 includes: an array substrate AR having a rectangular transparent substrate 11 which is made of such a material as glass and has various wiring lines on its surface; and a color-filter substrate CF which is shorter lengthwise than the array substrate AR and has a rectangular transparent substrate 12 made of such a material as glass. The edges of the array substrate AR and color-filter substrate CF are bonded together with a sealing material 13 therebetween. Injected into the space surrounded by the array substrate AR, color-filter substrate CF, and sealing material 13 is liquid crystal 14. These elements constitute the structure of the semi-transmissive LCD 10.

The transparent substrate 11 of the array substrate AR has a protrusive part 11a which protrudes a given length from the edge of the color-filter substrate CF bonded with the array substrate AR. Arranged in a matrix in a display area DA surrounded by the sealing material 13 on the array substrate AR are a plurality of scanning lines GW and signal lines SW. Disposed beside an intersection of a scanning line GW and a signal line SW is a switching element made of such a material as a TFT. Each segment surrounded by scanning lines GW and signal lines SW is a pixel area, which constitutes a single pixel.

Provided on the protrusive part 11a of the transparent substrate 11 is an IC chips embedding area 15 which is an allotted rectangular area and has a given dimension. Scanning lines GW and signal lines SW are led out of the display area DA and connected with gate lead-in lines GL and source lead-in lines SL, which are led around on the borders of the array substrate AR with their ends in the IC chips embedding area 15. Disposed at the end of the gate lead-in lines GL and source lead-in lines SL are terminals (not shown) respectively to connect to the IC chips.

Disposed in a plurality of locations on the border of the array substrate are TFT ambient light photosensors $LS_1$ to $LS_3$ to detect the intensity of ambient light. Locations accommodating the TFT ambient light photosensors $LS_1$ to $LS_3$ are not particularly limited; such locations may be suitably determined and provided at the four corners or on any side of the array substrate; and the number of TFT ambient light photosensors to be provided may be appropriately determined by one of ordinary skilful in the art. To demonstrate an example for use of the semi-transmissive LCD 10 in a cellular phone or any other portable device hereinafter, TFT ambient light photosensors $LS_1$ to $LS_3$ will be arranged at the following three locations: at both ends of the upper side of the array substrate and at the lower-left corner, which is not thought to be a place often covered with fingers. A detection circuit to process signals from the TFT ambient light photosensors $LS_1$ to $LS_3$ is provided inside the IC installed in the IC chips embedding area 15. The structure of the TFT ambient light photosensors $LS_1$ to $LS_3$ and detection circuit for signal processing will be detailed hereafter.

Second, the structure of a single pixel will be detailed. Referring to FIGS. 2 and 3, aligned in parallel at regular intervals on the display area DA on the transparent substrate 11 are a plurality of scanning lines GW, from which a TFT gate electrode G extends. Disposed on the display area DA on the transparent substrate 11 as well are auxiliary capacitance lines 16 so as to be nearly middle lines between two adjacent scanning lines GW and in parallel with the scanning lines GW. Disposed on an auxiliary capacitance line 16 is an auxiliary capacitance electrode 17 so as to be wider than the auxiliary capacitance line 16.

Laminated over the whole area of the transparent substrate 11 is a gate insulator 18 which is made of such a material as silicon nitride and silicon oxide, so as to cover the scanning lines GW, auxiliary capacitance lines 16, auxiliary capacitance electrodes 17 and gate electrodes G. Disposed over the gate electrodes G with the gate insulator 18 thereon is a semiconductor layer 19 which is made of such a material as amorphous silicon. Disposed on the gate insulator 18 are plurality of signal lines SW so as to intersect the scanning lines GW. From the signal lines SW extends a TFT source electrode S so as to have contact with the semiconductor layer 19. Provided on the gate insulator 18 as well are drain electrodes D which are made of the same material as that of the signal lines SW and source electrode S, so as to have contact with the semiconductor layer 19.

An area surrounded by the scanning lines GW and signal lines SW constitutes a single pixel. The gate electrode G, gate insulator 18, semiconductor layer 19, source electrode S, and drain electrode D constitute a TFT which serves as a switching element for each pixel. In this case, the drain electrode D and auxiliary capacitance electrode 17 constitute an auxiliary capacitance for each pixel.

Laminated over the whole area of the transparent substrate 11 is a protective insulator (also known as a passivation film) 20 which is made of an inorganic insulation material or the like, so as to cover the signal lines SW, TFTs, and gate insulators 18. Laminated on the protective insulator 20 over the whole area of the transparent substrate 11 is an interlayer (also known as a planarizing film) 21 made of such a material as acrylic resin containing a negative photosensitive material. The interlayer 21 has a rough surface with minute concavities and convexities in the reflective part 22, and a smooth surface in the transmissive part 23. Concavities and convexities in the reflective part 22 are not shown in FIGS. 2 and 3.

Formed on the surface of the interlayer 21 in the reflective part 22 is a reflector 24 which is made of such a material as aluminum or aluminum alloy, by a sputtering method. Bored through the protective insulator 20, interlayer 21, and reflector 24 at a position corresponding to the TFT drain electrode D is a contact hole 25.

Each pixel has a pixel electrode 26 which is made of such a material as indium tin oxide (ITO) and indium zinc oxide (IZO) on the surface of the reflector 24, inside the contact hole 25, and on the surface of the interlayer 21 in the transmissive part 23. Laminated on the surface of the pixel electrodes 26 is an alignment layer (not shown) so as to cover all the pixels.

The color-filter substrate CF has a color-filter layer 27 including red (R), green (G), and blue (B) color filters, for example, for each pixel, on the surface of the transparent substrate 12 made of such a material as glass at a position corresponding at least to the display area DA on the array substrate AR. Disposed on the surface of the color-filter layer 27 corresponding to the reflective part 22 is a topcoat layer 28. Laminated on the surface of the topcoat layer 28 and of the color-filter layers 27 corresponding to the transmissive part 23 are a common electrode 29 and alignment layer (not shown). Cyan (C), magenta (M), yellow (Y) or any other color filter may be freely combined into the color-filter layer 27. For a monochrome display, no color-filter layer may be used.

Arranged below the transparent substrate 11 is a backlight or sidelight including a known light source, optical waveguide plate, and light-diffusing sheet. Laminated on the surface of the pixel electrodes 26 is an alignment layer (not shown) so as to cover all the pixels. A color filter substrate including three—(R, G, and B) color filters and a common electrode (not shown) is placed to face the transparent substrate 11. The two substrates are bonded together by placing a sealing material around the edges thereof, and liquid crystal is injected between the substrates. Under this process, a semi-transmissive LCD 10 may be manufactured.

If a reflector 24 is disposed under all the pixel electrodes 26 in the process mentioned above, a reflective LCD panel will be manufactured. A reflective LCD including such a reflective LCD panel employs a frontlight instead of a backlight or sidelight.

The structure of the TFT ambient light photosensors $LS_1$ to $LS_3$ and a detection circuit for signal processing will now be detailed Referring to FIG. 1, three TFT ambient light photosensors $LS_1$ to $LS_3$ are provided on the locations on the border of the array substrate AR around the display area of the transparent substrate 11 thereof. Referring to FIG. 4, disposed on the surface of the transparent substrate 11 are a TFT gate electrode G, in the light receptor, one electrode $C_1$ of the capacitor C, and a TFT gate electrode Gs constituting a switching element S1, whose surface the gate insulator 18, which is made of such a material as silicon nitride and silicon oxide, is laminated so as to cover.

Formed on the TFT gate electrode GL in the light receptor and the TFT gate electrode Gs constituting a switching element S1, with the gate insulator 18 thereon, are semiconductor layers $19_L$ and $19_S$, respectively, which are made of such a material as amorphous silicon and polysilicon. Provided on the gate insulator 18 are a TFT source electrode $S_L$ and drain electrode $D_L$ in the light receptor, and a TFT source electrode Ss and drain electrode $D_S$ constituting the switching element S1 so as to have contact with the semiconductor layers $19_L$ and $19_S$ respectively. The TFT source electrodes $S_L$ and $S_S$ and drain electrodes $D_L$ and $D_S$ are made of such a metal as aluminum and molybdenum.

The TFT source electrode $S_L$ in the light receptor and the TFT drain electrode Ds constituting the switching element S1 are extended and connected together to form the other electrode $C_2$ of the capacitor C. A protective insulator 20 made of an inorganic insulation material or the like is laminated so as to cover the surface of the TFT of the light receptor, capacitor C, and TFT switching element S1. The surface of the TFT switching element S1 is covered with a black matrix BM so as to be unaffected by ambient light.

The TFT of the light receptor, capacitor C, and TFT switching element S1 in the TFT ambient light photosensors $LS_1$ to $LS_3$ may be formed at the same time as the TFTs for the switching elements in the semi-transmissive LCD 10 as mentioned above, and therefore, there is no need to introduce a separate process for formation of the TFT ambient light photosensors $LS_1$ to $LS_3$.

In the TFT ambient light photosensors $LS_1$ to $LS_3$ formed in the semi-transmissive LCD 10 as mentioned above, a constant reference voltage Vs (e.g., +2V) is applied to the TFT source electrode Ss constituting the switching element S1, voltages (e.g., ±10 V) are alternately applied to the gate electrode of the switching element S1 to turn the TFT on and off, and a constant voltage (e.g., −10V) is applied to the TFT gate electrode GL in the light receptor to operate the TFT in the light receptor in a gate-off state.

Referring to the block diagram of FIG. 5, outputs from the TFT ambient light photosensors $LS_1$ to $LS_3$ are processed in a detection circuit for signal processing provided inside the IC installed in the IC chips embedding area 15. The detection circuit includes comparators $Cmp_1$ to $Cmp_3$ and a control unit Cnt. Outputs from the TFT ambient light photosensors $LS_1$ to $LS_3$ are entered into the control unit Cnt via the comparators $Cmp_1$ to $Cmp_3$. The control unit Cnt includes a discrimination implement Maj which includes a majority circuit, for example, and a lighting control circuit LTcnt. On the basis of outputs from the discrimination implement Maj, the lightning control circuit LTcnt controls the brightness of the illumination unit. The comparators $Cmp_1$ to $Cmp_3$ may employ a comparator circuit that includes an operational amplifier operating to synchronize with switching of the switching element S1 in the TFT ambient light photosensors $LS_1$ to $LS_3$.

The discrimination implement Maj including a majority circuit may be the combination of an AND circuit and an exclusive OR circuit, as shown in FIG. 6. According to the inputs $IN_1$ to $IN_3$ entered into the discrimination implement Maj including a majority circuit, the output Out therefrom changes as shown in the logical table of Table 1 below.

TABLE 1

| $IN_1$ | $IN_2$ | $IN_3$ | Out |
|---|---|---|---|
| H | H | H | H |
| H | H | L | H |
| H | L | H | H |
| H | L | L | L |
| L | H | H | H |
| L | H | L | L |
| L | L | H | L |
| L | L | L | L |

Referring to FIG. 7, a reference voltage $V_0$ for the comparators $Cmp_1$ to $Cmp_3$ may be appropriately set to a voltage level that cannot be reached by an output from a TFT ambient light photosensor shaded from light within a given measuring time ti which synchronizes with the switching timing of the switching element S1 in the TFT ambient light photosensors $LS_1$ to $LS_3$. If ambient light is bright with none of the TFT ambient light photosensors $LS_1$ to $LS_3$ shaded, all outputs therefrom will reach the reference voltage $V_0$ within the given measuring time ti, and all outputs $IN_1$ to $IN_8$ from the comparators $Cmp_1$ to $Cmp_3$ will be high (represented by "H" in the table). The output Out from the discrimination implement Maj, therefore, will be H, which causes the lightning control circuit LTcnt to turn the illumination unit OFF (into a dark condition).

If ambient light is dark even with not all of the TFT ambient light photosensors $LS_1$ to $LS_3$ shaded, no output therefrom will reach the reference voltage $V_0$ within the given measuring time ti, and all outputs $IN_1$ to $IN_3$ will be low ("L" in the table). The output Out from the discrimination implement Maj, therefore, will be L, which causes the lightning control circuit LTcnt to turn the illumination unit ON (into a bright condition).

If ambient light is bright with only a third TFT ambient light photosensor $LS_3$ temporarily shaded, the outputs from the TFT ambient light photosensors $LS_1$ and $LS_2$, which are not shaded, will reach the reference voltage $V_0$ within the given measuring time ti, and $IN_1$ and $IN_2$ will be H. On the other hand, the output from the third TFT ambient light photosensor $LS_3$ will not reach the reference voltage $V_0$ within the given measuring time ti, and $IN_3$ will be L. The output Out from the discrimination implement Maj, therefore, will be H; the output from the third TFT ambient light photosensor $LS_3$ is ignored. Consequently, the lightning control circuit LTcnt controls to turn the illumination unit OFF (into a dark condition).

As demonstrated above, when one of the three TFT ambient light photosensors in the semi-transmissive LCD 10 described in the embodiment herein is temporarily shaded, the output from the TFT ambient light photosensor shaded from light is ignored by the discrimination implement Maj, which prevents false detection of weaker ambient light. In addition, as clearly illustrated in FIG. 5, the semi-transmissive LCD 10 described in the embodiment herein enjoys easy control of the brightness of its illumination unit based on a single output from the majority of TFT ambient light photosensors without using a plurality of interface circuits, A/D converters, and the like in related-art examples.

While demonstrated above is operation of the semi-transmissive LCD 10 described in the embodiment herein with one of the three TFT ambient light photosensors temporarily shaded; similar operation is expected when one of the three TFT ambient light photosensors is broken and cannot submit an output. Used in the embodiment herein are three TFT ambient light photosensors, while three or more TFT ambient light photosensors may also be applied.

While demonstrated in the embodiment herein as the semi-transmissive LCD 10 is an example of employing TFT ambient light photosensors, ambient light photosensors based on a different operation principle may have similar functions and advantageous effects if a circuit structure is devised and modified to have a correlation between the intensity of ambient light and the time period taken for an output from such an ambient light photosensor to reach a predetermined value.

A reference voltage $V_0$ for the comparators $Cmp_1$ to $Cmp_3$ may be user-definable with a variable resistor in the voltage range that cannot be reached by an output from a TFT ambient light photosensor shaded from light within a given measuring time ti which synchronizes with the switching timing of the switching element S1 in the TFT ambient light photosensors $LS_1$ to $LS_3$.

Demonstrated in the embodiment herein as the semi-transmissive LCD 10 is an example of controlling the intensity of the illumination light based on the intensity of ambient light measured by photodetectors. In addition, the architecture for correcting images displayed on the LCD panel may be applied based on the intensity of ambient light.

The TFT ambient light photosensors used for photodetectors in the semi-transmissive LCD 10 illustrated in the embodiment are described as formation on the array substrate AR. TFT ambient light photosensors, however, may be formed on the color-filter substrate CF, or on the enclosure beside the display area of a cellular phone or any other portable device as long as each TFT ambient light photosensor may capture ambient light on the light receptor. The detection circuit in the semi-transmissive LCD 10 described in the embodiment is described as provided in the IC installed in the IC chips embedding area 15. A detection circuit, however, may be provided beside the TFT ambient light photosensors $LS_1$ to $LS_3$ or outside the semi-transmissive LCD 10 with any type of LCD panel applied.

Described in the embodiment herein is a semi-transmissive LCD panel, while a transmissive or reflective LCD panel may also be applied. When a transmissive LCD panel is used, the backlight used for an illumination unit is set to be brighter with strong ambient light, and to be on but weaker with weak ambient light. When a reflective LCD panel is used, the frontlight used for an illumination unit is set to turn off with strong ambient light, and to turn on with weak ambient light.

The above description reveals that the invention is applicable to an LCD employing any type of LCD panel. The above-mentioned LCD may be applied to such an electronic device as a personal computer, cellular phone, and portable digital assistant. FIG. 9 shows examples of application thereof to a personal computer and cellular phone.

Figure 9A:
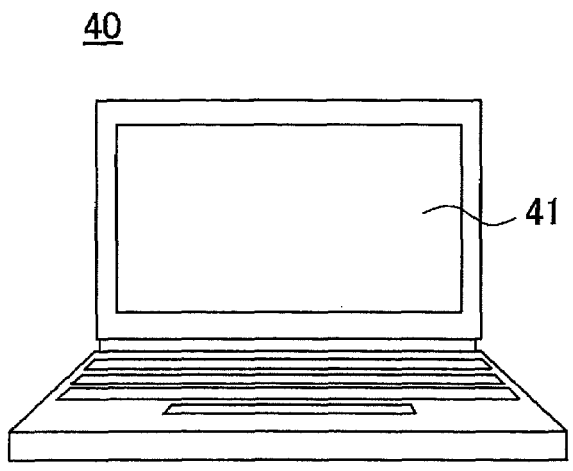
FIG. 9A shows a personal computer equipped with an LCD.
Figure 9B:
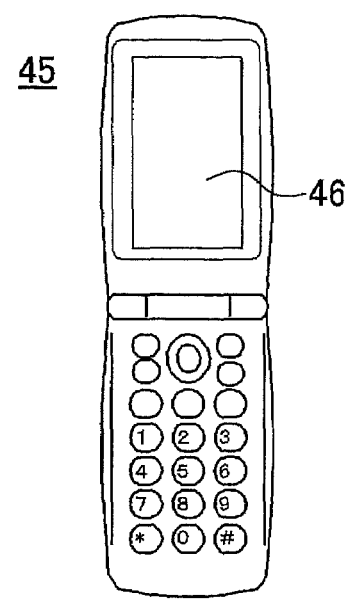
FIG. 9B shows a cellular phone equipped with an LCD.
Figure 10:
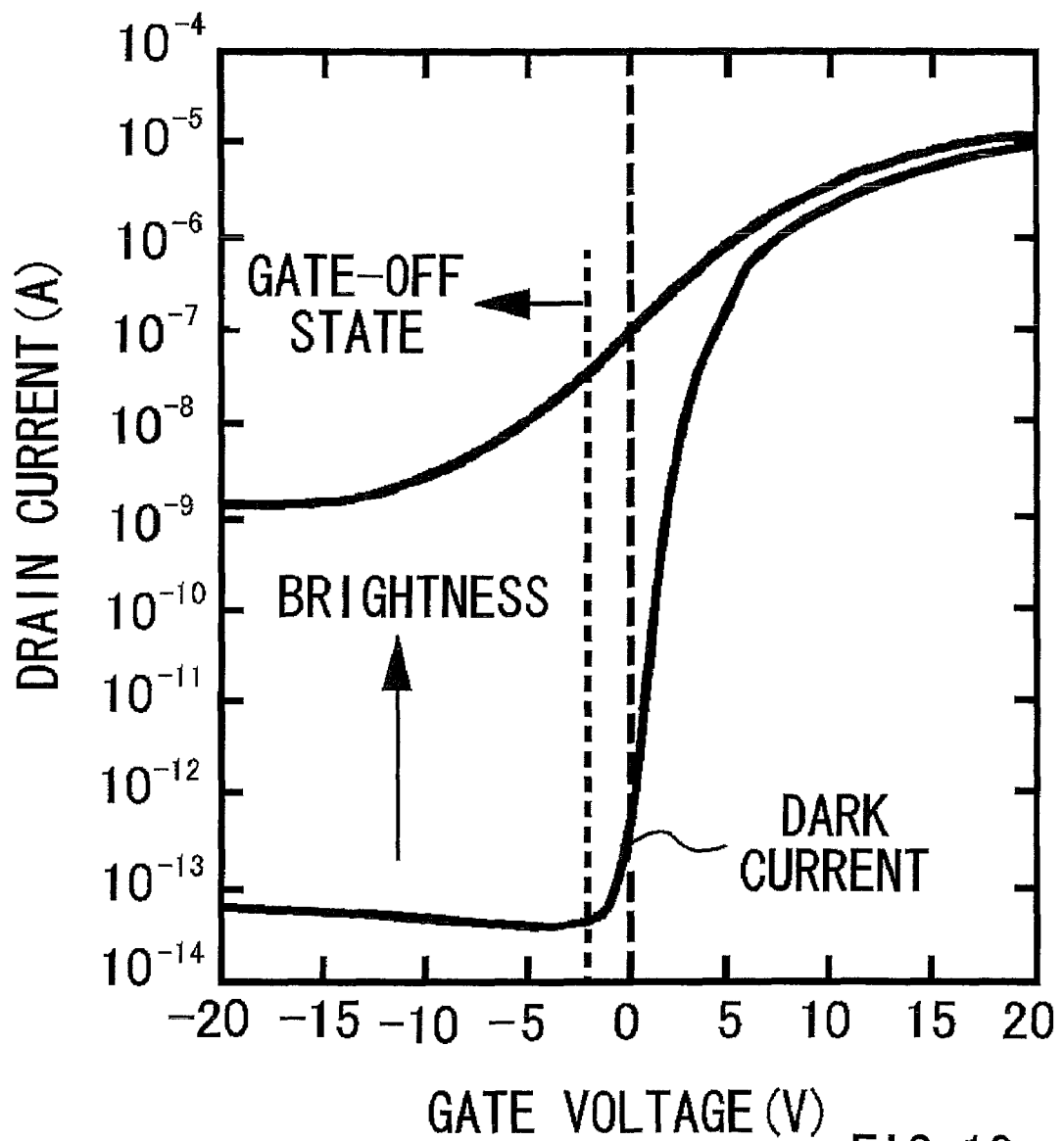
FIG. 10 is a diagram showing an example of voltage rent curves for a TFT ambient light photosensor.
Figure 11:
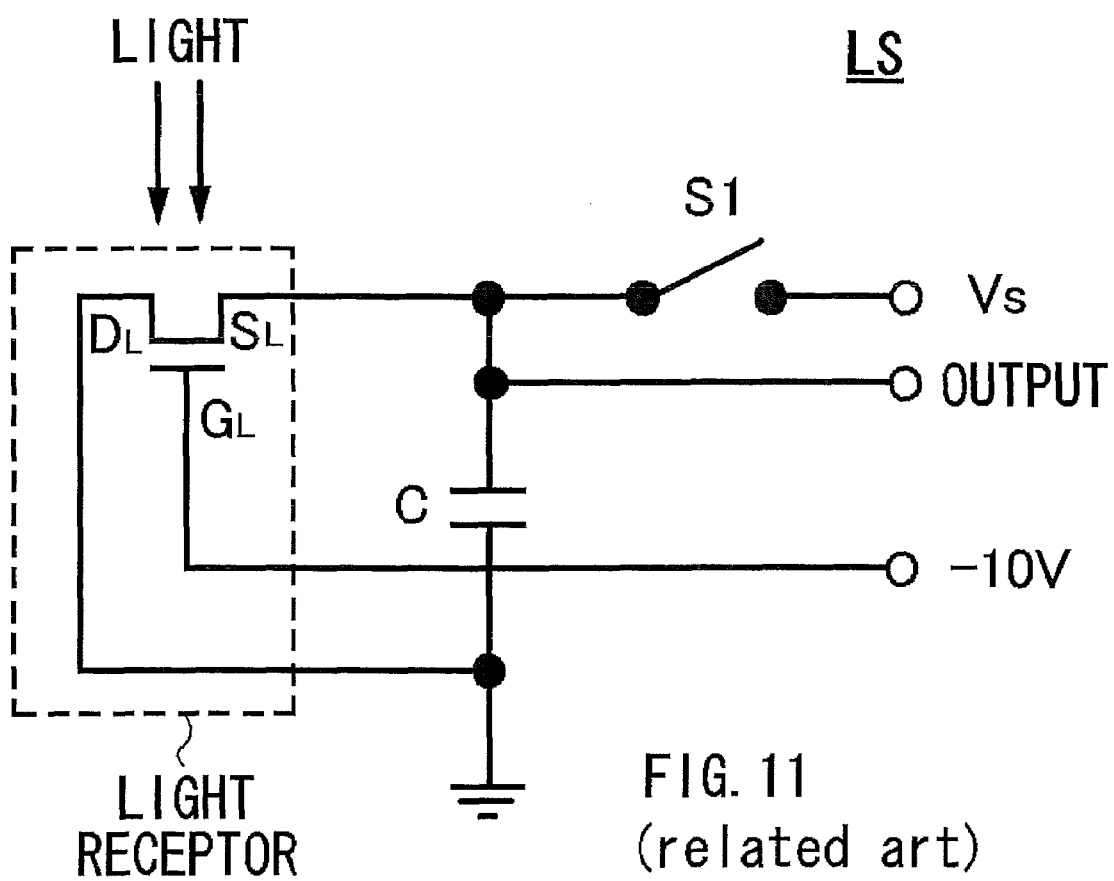
FIG. 11 is an operating circuit diagram of a TFT ambient light photosensor.
Figure 12:
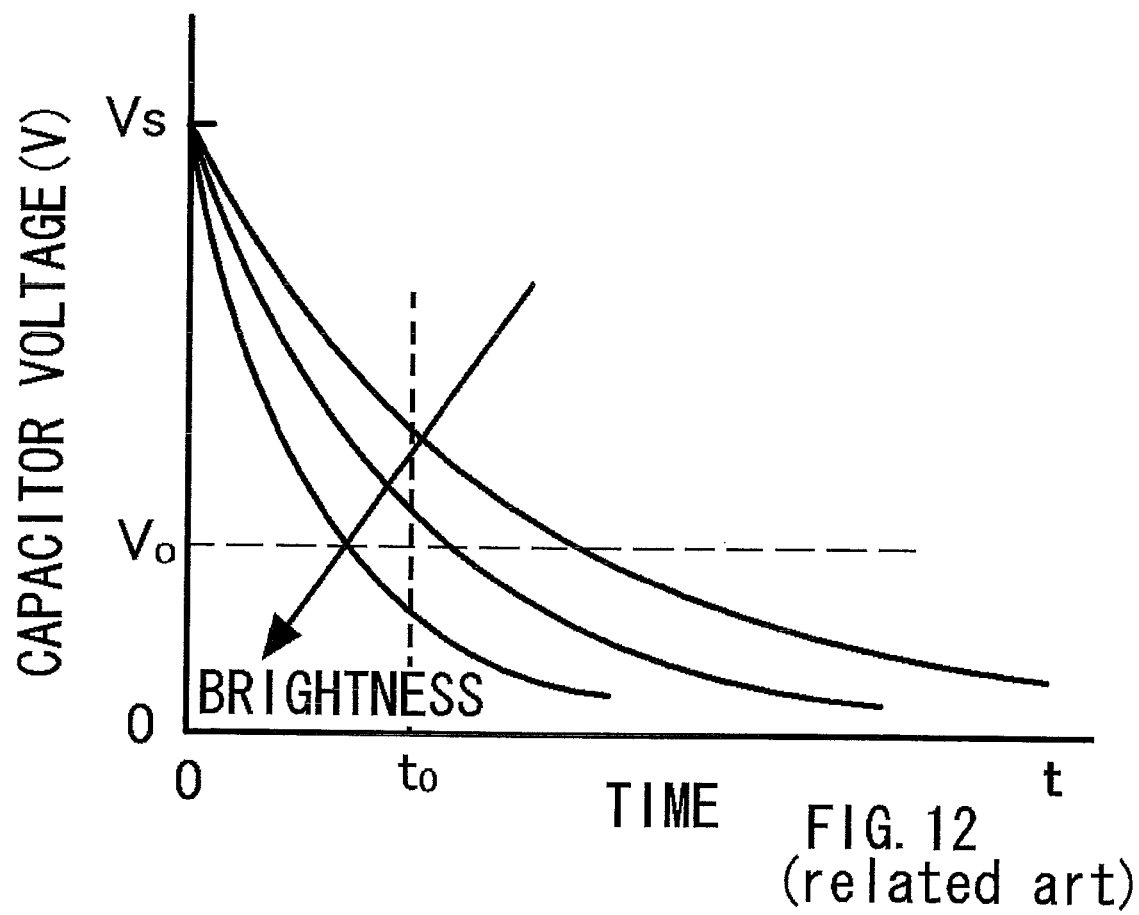
FIG. 12 is a diagram showing curves for a voltage at both ends of a capacitor versus time in the circuit diagram shown in FIG. 11 at different brightness levels.

FIG. 9A shows a personal computer 40 equipped with an LCD 41. FIG. 9B shows a cellular phone 45 equipped with an LCD 46. Since the basic structures of the personal computer 40 and cellular phone 45 are well known to those skilled in the art, detailed description thereof will be omitted.

What is claimed is:

1. A liquid crystal display panel comprising:
a pair of substrates sandwiching a liquid crystal layer therebetween;
an illumination unit for the liquid crystal display panel;
a plurality of photodetectors that detect intensity of ambient light;
a plurality of detection circuits each directly coupled to one of the plurality of photodetectors, each detection circuit including a different comparator; and
a control unit for controlling brightness of the illumination unit for the liquid crystal display panel based on outputs from the detection circuits;
wherein each of the detection circuits includes a circuit logically inverted when an output from the photodetector coupled to the detection circuit reaches a predetermined value,
wherein the control unit includes a discrimination implement that determines the intensity of the ambient light has changed when outputs from half or more of the detection circuits are logically inverted, and
wherein each of the photodetectors is a thin film transistor ambient light photosensor in which a time period taken to decrease to a predetermined voltage after a switching element in the photosensor has been turned off is inversely proportional to the intensity of the ambient light, and
wherein the photodetectors and the detection circuits are both provided on the substrates included in the liquid crystal display panel.

2. A liquid crystal display panel comprising:
a pair of substrates sandwiching a liquid crystal layer therebetween;
an illumination unit for the liquid crystal display panel;
a plurality of photodetectors that detect intensity of ambient light;
a plurality of detection circuits each directly coupled to one of the plurality of photodetectors, each detection circuit including a different comparator; and
a control unit for controlling brightness of the illumination unit for the liquid crystal display panel based on outputs from the detection circuits;
wherein each of the detection circuits includes a circuit logically inverted when an output from the photodetector coupled to the detection circuit reaches a predetermined value,
wherein the control unit includes a discrimination implement that determines the intensity of the ambient light has changed when outputs from half or more of the detection circuits are logically inverted, and
wherein each of the photodetectors is a thin film transistor ambient light photosensor in which a time period taken to decrease to a predetermined voltage after a switching element in the photosensor has been turned off is inversely proportional to the intensity of the ambient light,
wherein each of the photodetectors includes a light-receiving element made of a thin-film transistor, and a capacitor coupled between a source electrode and a drain electrode of the thin-film transistor, one terminal of the capacitor being coupled to a reference voltage supply via a switching element and another terminal of the capacitor being coupled to a predetermined potential, a gate electrode of the thin-film transistor being applied with a constant voltage which is a reverse-bias voltage lower than the predetermined potential, and each of the detection circuits including a circuit which is coupled to one terminal of the capacitor included in each of the photodetectors, activates the switching element for a short period of time to apply the capacitor with a reference voltage supplied from the reference voltage supply and charge the capacitor, turns off the switching element, and is logically inverted when the voltage of the capacitor reaches a predetermined value.

3. A liquid crystal display panel comprising:

a pair of substrates sandwiching a liquid crystal layer therebetween;

an illumination unit for the liquid crystal display panel;

a plurality of photodetectors that detect intensity of ambient light;

a plurality of detection circuits each directly coupled to one of the plurality of photodetectors, each detection circuit including a different comparator; and a control unit for controlling brightness of the illumination unit for the liquid crystal display panel based on outputs from the detection circuits;

wherein each of the detection circuits includes a circuit logically inverted when an output from the photodetector coupled to the detection circuit reaches a predetermined value, wherein the control unit includes a discrimination implement that determines the intensity of the ambient light has changed when outputs from half or more of the detection circuits are logically inverted, and wherein each of the photodetectors is a thin film transistor ambient light photosensor in which a time period taken to decrease to a predetermined voltage after a switching element in the photosensor has been turned off is inversely proportional to the intensity of the ambient light, and wherein the illumination unit is a backlight, and the liquid crystal display panel is a transmissive or semi-transmissive liquid crystal display panel.

* * * * *